United States Patent
Kim

(10) Patent No.: US 10,882,551 B2
(45) Date of Patent: Jan. 5, 2021

(54) APPARATUS AND METHOD FOR REDUCING VIBRATIONS OF ELECTRONIC POWER STEERING APPARATUS

(71) Applicant: MANDO CORPORATION, Gyeonggi-do (KR)

(72) Inventor: Hyeok Kim, Daegu (KR)

(73) Assignee: MANDO CORPORATION, Gyeonggi-Do (KR)

(*) Notice: Subject to any disclaimer, the term of this patent is extended or adjusted under 35 U.S.C. 154(b) by 144 days.

(21) Appl. No.: 14/973,640

(22) Filed: Dec. 17, 2015

(65) Prior Publication Data
US 2017/0174255 A1    Jun. 22, 2017

(51) Int. Cl.
*B62D 5/04*   (2006.01)
*B62D 6/10*   (2006.01)
*B62D 6/06*   (2006.01)

(52) U.S. Cl.
CPC .............. *B62D 5/0472* (2013.01); *B62D 6/06* (2013.01); *B62D 6/10* (2013.01)

(58) Field of Classification Search
CPC ........... B62D 5/0472; B62D 6/10; B62D 6/06
See application file for complete search history.

(56) References Cited

U.S. PATENT DOCUMENTS

| | | | |
|---|---|---|---|
| 5,386,372 A * | 1/1995 | Kobayashi | B60G 17/018 700/280 |
| 5,504,403 A * | 4/1996 | McLaughlin | B62D 5/0463 180/446 |
| 5,629,986 A * | 5/1997 | Shoureshi | B60G 17/018 381/71.12 |
| 5,919,241 A * | 7/1999 | Bolourchi | B62D 5/0466 180/443 |
| 6,122,579 A * | 9/2000 | Collier-Hallman | B62D 5/0472 180/234 |
| 6,250,419 B1 * | 6/2001 | Chabaan | B62D 5/0463 180/443 |
| 6,370,459 B1 * | 4/2002 | Phillips | B62D 5/0436 180/443 |
| 6,535,806 B2 * | 3/2003 | Millsap | B62D 5/006 180/443 |

(Continued)

FOREIGN PATENT DOCUMENTS

KR    10-2009-0019248    2/2009

*Primary Examiner* — Genna M Mott
*Assistant Examiner* — Majdi Alsomiri
(74) *Attorney, Agent, or Firm* — Ladas & Parry, LLP

(57) ABSTRACT

An apparatus for reducing vibrations of an electronic steering apparatus includes a vibration filter unit which extracts a steering vibration signal that is a radio frequency component of a torque signal transmitted from a torque sensor, a signal generation unit which generates a reference signal based on one of a wheel speed and a wheel vibration number transmitted from a sensor mounted in a vehicle, an adaptive filter which receives the reference signal generated by the signal generation unit and generates a current control signal, a motor which receives the current control signal, and an error unit which stores a steering vibration component value generated based on the steering vibration signal and the current control signal applied to the motor. Here, the steering vibration component value stored in the error unit is provided as feedback to the adaptive filter to update the adaptive filter with a coefficient.

20 Claims, 3 Drawing Sheets

(56) References Cited

U.S. PATENT DOCUMENTS

| | | | | |
|---|---|---|---|---|
| 6,651,771 | B2* | 11/2003 | Chabaan | B62D 5/0463 180/446 |
| 6,658,335 | B2* | 12/2003 | Kleinau | B62D 5/0463 180/443 |
| 8,116,944 | B2* | 2/2012 | Hales | B62D 5/0472 701/41 |
| 8,554,417 | B2* | 10/2013 | Yu | B62D 5/0472 180/443 |
| 9,150,243 | B2* | 10/2015 | Lach | B62D 5/0463 |
| 9,159,207 | B2* | 10/2015 | Harris | G06F 3/016 |
| 2003/0052639 | A1* | 3/2003 | Tanaka | B62D 5/0463 318/632 |
| 2003/0055544 | A1* | 3/2003 | Amberkar | B62D 5/001 701/41 |
| 2005/0273235 | A1* | 12/2005 | Ohta | B62D 5/008 701/41 |
| 2007/0192005 | A1* | 8/2007 | Ishikawa | B62D 5/0472 701/41 |
| 2009/0224502 | A1* | 9/2009 | Yamawaki | B60G 17/06 280/124.108 |
| 2010/0211263 | A1* | 8/2010 | Lindenstruth | B62D 5/0472 701/41 |
| 2010/0324784 | A1* | 12/2010 | Yu | B62D 5/0472 701/42 |
| 2012/0197493 | A1* | 8/2012 | Fujimoto | B62D 5/0463 701/41 |
| 2012/0271513 | A1* | 10/2012 | Yoneda | B62D 5/0484 701/41 |
| 2014/0058630 | A1* | 2/2014 | Kezobo | B62D 5/0472 701/42 |
| 2016/0200354 | A1* | 7/2016 | Kimura | B62D 5/0472 701/42 |

* cited by examiner

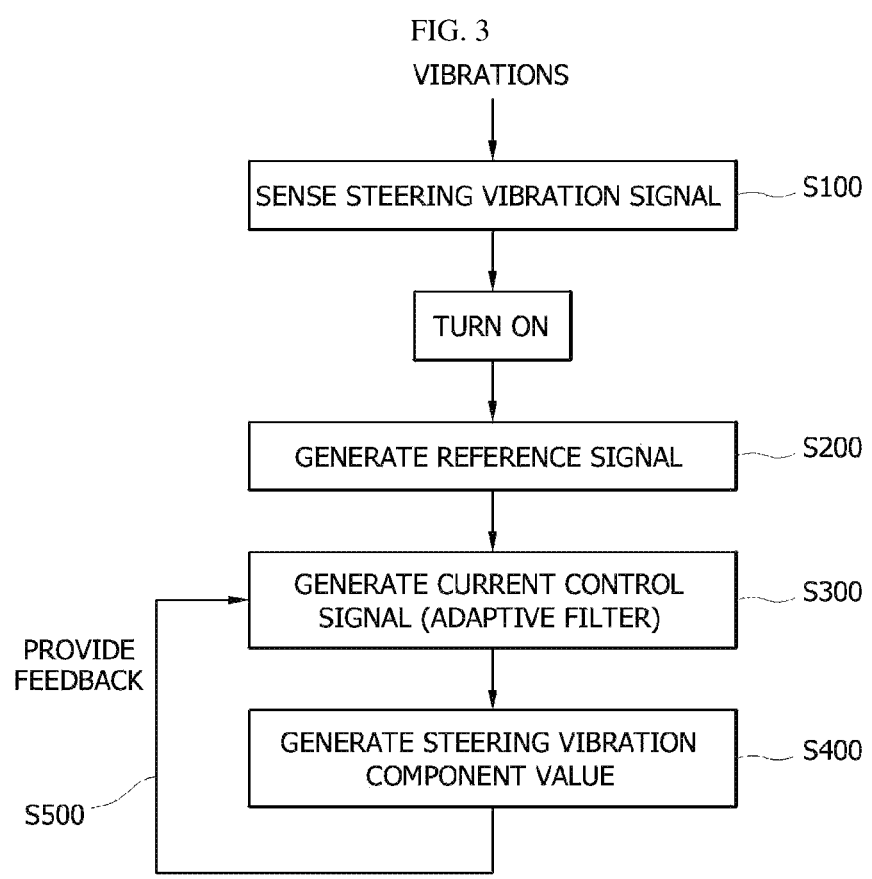

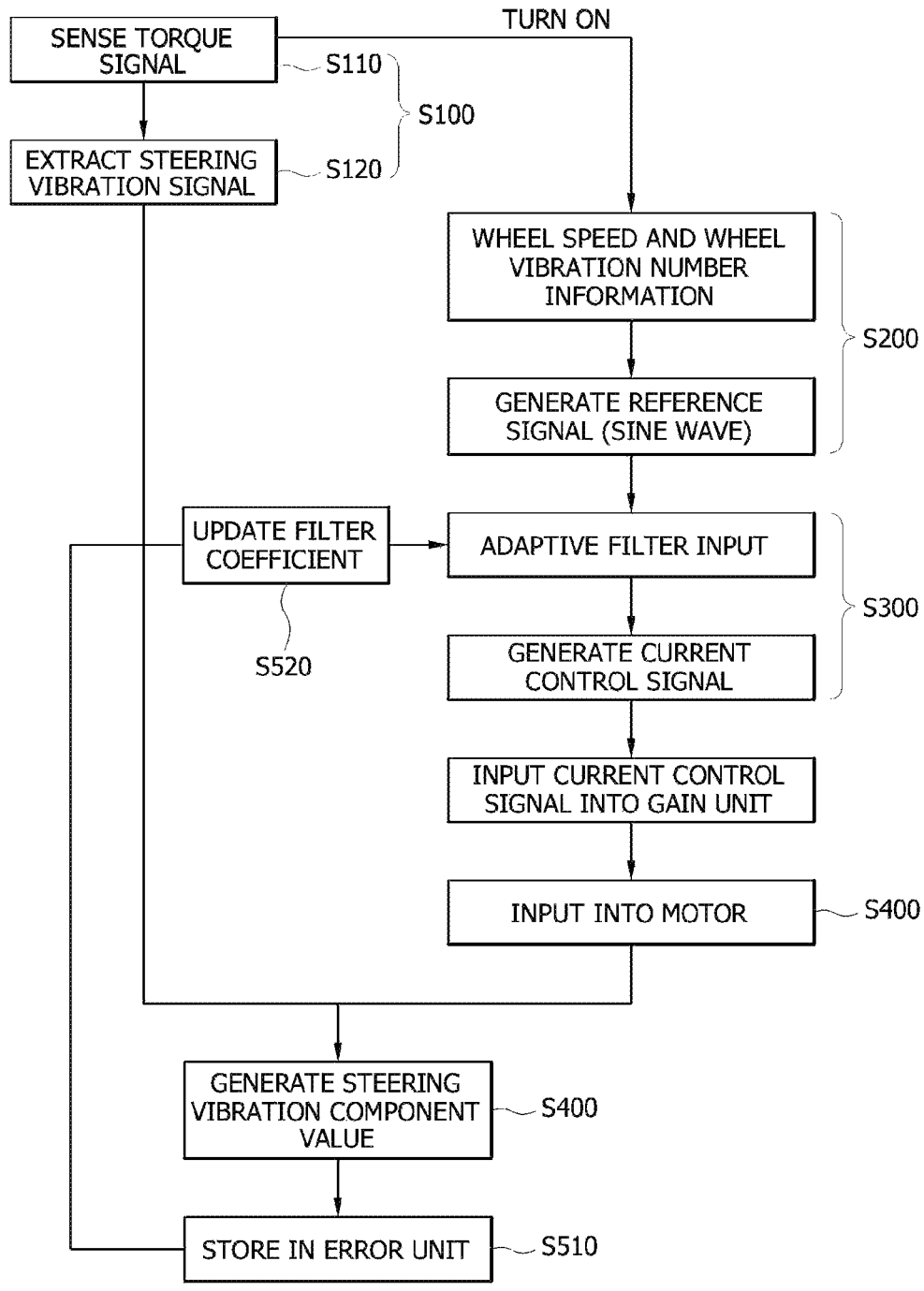

APPARATUS AND METHOD FOR REDUCING VIBRATIONS OF ELECTRONIC POWER STEERING APPARATUS

BACKGROUND

1. Field of the Invention

The present invention relates to a steering apparatus, and more particularly, to an apparatus and a method for helping a driver drive in an optimal state by reducing vibrations generated by an electronic steering apparatus while driving a vehicle.

2. Discussion of Related Art

Electronic power steering (EPS) apparatuses, unlike hydraulic steering apparatuses, are a steering system using a motor, which help a driver drive in an optimal state based on magnetic flux, torque, a steering angle, etc.

Generally, such electronic steering apparatuses include an electronic control unit (ECU), a valve, a shaft, a column box, a gearbox, etc.

In such steering apparatuses, vibrations or tremors may occur due to various causes. Such vibrations or tremors deteriorate a steering feeling of a driver to increase fatigue of the driver, thereby interrupting driving.

In general, to prevent such vibrations or tremors, a heterodyne algorithm, etc. are applied. However, due to a slow and complicated algorithm structure in which a load is great due to a large amount of computation, a large amount of time is necessary for tuning to perform.

A following prior art document relates to a method of reducing vibrations of a steering wheel during braking and an ECU, and discloses a technology related to the ECU but does not include technical features of the present invention.

PRIOR ART DOCUMENT

Korean Patent Publication No. 10-2009-0019248

SUMMARY OF THE INVENTION

An apparatus and a method for reducing vibrations of an electronic steering apparatus according to an embodiment of the present invention are provided according to following aspects.

First, there are provided an apparatus and a method for detecting and reducing vibrations generated in an electronic steering apparatus.

Second, there are provided an apparatus and a method of effectively reducing vibrations in various vehicles.

Third, by reducing vibrations, an optimal driving environment is provided to a driver more simply than a general method.

The technical objectives of the present invention are not limited to the above disclosure; other objectives not mentioned above may become apparent to those of ordinary skill in the art based on the following descriptions.

According to an aspect of the present invention, there is provided an apparatus for reducing vibrations of an electronic steering apparatus. The apparatus includes a vibration filter unit which extracts a steering vibration signal that is a radio frequency component of a torque signal transmitted from a torque sensor, a signal generation unit which generates a reference signal based on one of a wheel speed and a wheel vibration number transmitted from a sensor mounted in a vehicle, an adaptive filter which receives the reference signal generated by the signal generation unit and generates a current control signal, a motor which receives the current control signal, and an error unit which stores a steering vibration component value generated based on the steering vibration signal and the current control signal applied to the motor. Here, the steering vibration component value stored in the error unit is provided as feedback to the adaptive filter to update the adaptive filter with a coefficient.

The apparatus may include a gain unit which receives the current control signal and modifies a level and a phase of the current control signal.

The adaptive filter may be formed as a finite impulse response (FIR) filter.

According to another aspect of the present invention, there is provided a method of reducing vibrations of an electronic steering apparatus. The method includes sensing a steering vibration signal while a vehicle is driven, generating a reference signal based on at least one of a wheel speed and a wheel vibration number transmitted from a sensor of the vehicle, generating a current control signal by inputting the reference signal into an adaptive filter, generating a steering vibration component value based on the steering vibration signal by applying the current control signal to a motor, and providing the steering vibration component value as feedback to the adaptive filter.

The sensing of the steering vibration signal may include sensing, by a torque sensor, a torque signal and extracting the steering vibration signal by inputting the torque signal into a vibration filter unit.

At least one of a level and a phase of the current control signal may be modified by a gain unit and is applied to the motor.

The providing feedback to the adaptive filter may include storing the steering vibration component value in an error unit and providing the steering vibration component value stored in the error unit 60 as feedback to the adaptive filter to update the adaptive filter with the coefficient.

The adaptive filter may be formed as an FIR filter.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 3 is a flowchart illustrating a method of reducing vibrations of an electronic steering apparatus according to another embodiment of the present invention; and FIG. 4 is a detailed flowchart illustrating each operation of the method of reducing vibrations of the electronic steering apparatus according to another embodiment of the present invention.

DETAILED DESCRIPTION OF EXEMPLARY EMBODIMENTS

Embodiments of the present invention will be described in detail with reference to the attached drawings. The attached drawings are only to allow the concept of the present invention to be easily understood. However, it will be understood that the concept of the present invention is not limited by the attached drawings.

Figure 1:
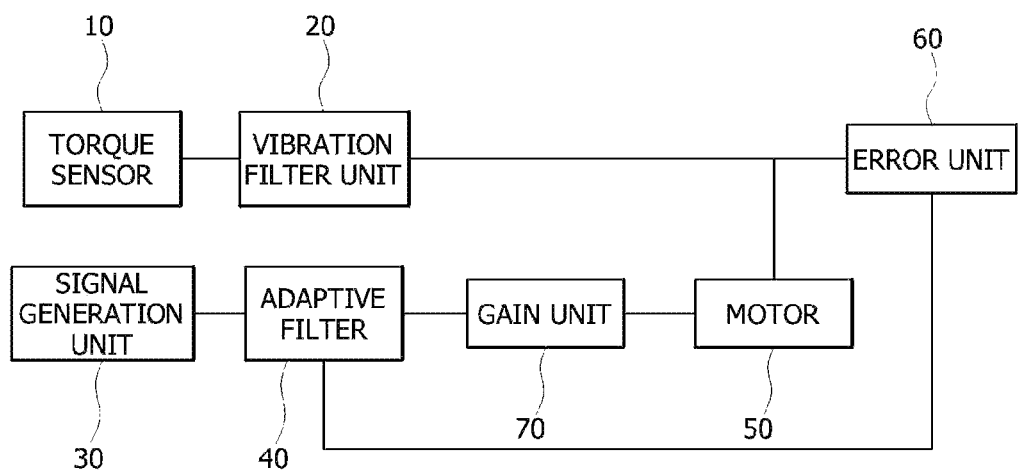
FIG. 1 is a block diagram of an apparatus for reducing vibrations of an electronic steering apparatus according to one embodiment of the present invention.

As shown in FIG. 1, an apparatus for reducing vibrations of an electronic steering apparatus according to one embodiment of the present invention includes a vibration filter unit 20, a signal generation unit 30, an adaptive filter 40, and an error unit 60.

The vibration filter unit 20 extracts a steering vibration signal that is a radio frequency component of a steering torque signal received from a torque sensor 10, in which the steering vibration signal is formed at about 10 to 20 Hz.

The vibration filter unit 20 may be formed as a band pass filter which filters out a certain frequency signal, may be formed as a low filter which blocks a low frequency domain to pass only a high frequency, or may be formed as a high pass filter to pass only a high frequency domain.

As described above, the steering vibration signal extracted by the vibration filter unit 20 generates vibrations in the steering apparatus.

The signal generation unit 30 generates a reference signal that is a sine wave based on one of a wheel speed and a wheel vibration number transmitted from a sensor mount in a vehicle.

Also, the reference signal may be generated based on wheel speed data transmitted from an electronic speed control (ESC) module through a controller area network (CAN) of the vehicle.

Here, a frequency of the reference signal is preferably formed to be identical to a rotational frequency of vehicular wheels.

The adaptive filter 40 receives the reference signal generated by the signal generation unit 30 and generates a current control signal.

A motor 50 receives the current control signal generated by the adaptive filter 40.

For the above reasons, when the current control signal is applied to the motor 50, since the motor 50 rotates in a direction opposite to vibrations generated by the steering vibration signal, the vibrations are affected and a steering vibration component value is generated due to the effect. As a result, when the steering vibration component value approaches '0', the vibrations are reduced.

The error unit 60 stores the steering vibration component value generated based on the steering vibration signal and the current control signal applied to the motor 50.

Also, the steering vibration component value stored in the error unit 60 is provided as feedback to the adaptive filter 40 and updates a coefficient of the adaptive filter 40, which is called a cycle.

As a result, due to the updated coefficient of the adaptive filter 40, the current control signal is regenerated or modified and applied to the motor 50 again.

To reduce vibrations of the steering apparatus, the steering vibration component value is continuously provided as feedback to the adaptive filter 40 and the coefficient of the adaptive filter 40 is updated.

That is, since the vibrations of the steering apparatus disappear when the steering vibration component value becomes '0', the steering vibration component value is provided as feedback until the steering vibration component value becomes '0' or approaches '0', thereby updating the coefficient of the adaptive filter 40.

Also, even though the steering vibration component value is '0', the providing of feedback is not interrupted. In this case, the coefficient of the adaptive filter 40 is continuously updated as the same value.

Also, although a heterodyne algorithm is used in a conventional case, complicated computations including sin, cos, etc. are necessary to extract a certain frequency component. Since a microcontroller unit (MCU) has a great computation load, a low speed, and a complicated algorithm structure, many modifications are necessary to provide optimum performance.

However, since employing a method of changing a filter coefficient to simply reduce vibrations, the adaptive filter 40 performs simpler computation than the heterodyne algorithm, thereby providing a high speed.

Due thereto, since vibrations are reduced by responding to vibrations generated in the steering apparatus in real time, an optimal driving environment may be provided to a driver.

As shown in FIG. 1, the apparatus for reducing vibrations of the electronic steering apparatus according to one embodiment of the present invention may include a gain unit 70 which receives the current control signal.

The gain unit 70 receives the current control signal and modifies a level and a phase of the current control signal.

Although the steering vibration component value may approach '0' to reduce vibrations without the gain unit 70, when the steering vibration component value starts with a too great value or an unexpected value, a large amount of time may be consumed for reducing the vibrations and greater vibrations may occur.

Accordingly, values related to vehicular properties which have a great effect on the steering vibration component value are stored in the gain unit 70 and the current control signal is modified based on the values stored in the gain unit 70, thereby quickly reducing the vibrations.

Also, the gain unit 70 may be modified to apply to various vehicles.

Figure 2:
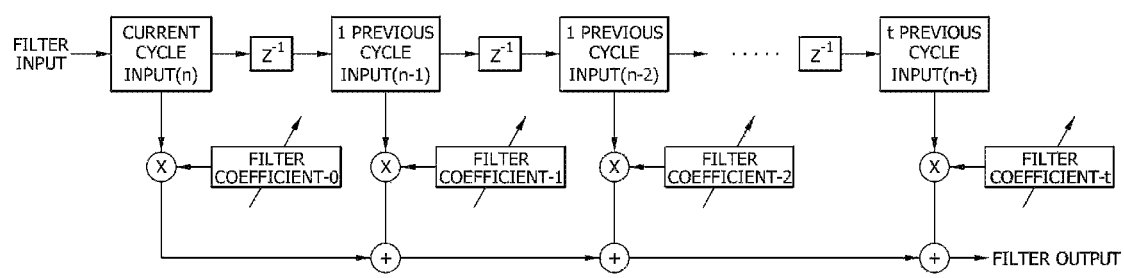
FIG. 2 is a block diagram of a finite impulse response (FIR) filter of the electronic steering apparatus according to one embodiment of the present invention.

As shown in FIG. 2, the adaptive filter 40 of the apparatus for reducing the vibrations of the electronic steering apparatus according to one embodiment of the present invention may be formed as a finite impulse response (FIR) filter.

An FIR form is shown as following Equation.

$$y=ax(n)+bx(n-1)+cx(n-2)+\ldots zx(n-t)$$

Here, a, b, and c indicate coefficients, x(n) indicates an input value of a current cycle, and y indicates an output value of the current cycle. For example, x(n−5) indicates an input value 5 cycles prior.

Generally, an FIR filter has a fixed coefficient. However, the FIR filter applied to the adaptive filter 40 is updated with a coefficient whenever receiving feedback.

Also, such an FIR filter may be formed as a least mean squares (LMS) filter, a recursive least squares (RLS) filter, etc. Since the types described above are already well known, a detailed description thereof will be omitted.

Hereinafter, a method of reducing vibrations of an electronic steering apparatus according to another embodiment of the present invention will be described. A repetitive description of the apparatus of reducing the vibrations of the electronic steering apparatus according to one embodiment of the present invention will be omitted.

As shown in FIGS. 3 and 4, the method of reducing the vibrations of the electronic steering apparatus according to another embodiment of the present invention includes sensing a steering vibration signal (S100), generating a reference signal (S200), generating a current control signal (S300), generating a steering vibration component value (S400), and providing feedback to the adaptive filter 40 (S400).

In the sensing of the steering vibration signal (S100), vibrations generated in a steering apparatus while a vehicle is driven are sensed.

In the generating of the reference signal (S200), the reference signal formed of a sine wave is generated based on at least one of a wheel speed and an angular frequency transmitted from a sensor of the vehicle.

Here, a frequency of the reference signal may be formed identical to a rotational frequency of vehicular wheels.

In the generating of the current control signal (S300), the current control signal is generated by inputting the reference signal to the adaptive filter 40.

In the generating of the steering vibration component value (S400), the current control signal is applied to the motor 50 and the steering vibration component value is generated based on the steering vibration signal.

In the providing feedback (S400), the steering vibration component value is provided as feedback to the adaptive filter 40.

In this case, when the steering vibration signal is sensed at the steering apparatus while the vehicle is driven, the reference signal formed of the sine wave is generated based on the wheel speed and a wheel vibration number transmitted from the sensor of the vehicle.

After that, the current control signal is generated by inputting the reference signal into the adaptive filter 40 and the generated current control signal is applied to the motor 50 to generate the steering vibration component value based on the steering vibration signal. Also, the steering vibration component value is provided as feedback to the adaptive filter 40.

As a result, when the steering vibration component value is provided as feedback to the adaptive filter 40, the current control signal is regenerated or modified by the adaptive filter 40 and applied to the motor 50 again to affect the vibrations, thereby regenerating or modifying the steering vibration component value.

Feedback is repetitively provided until the steering vibration component value becomes '0' or approaches '0'. Also, since vibrations occur in real time during driving, the vibrations of the steering apparatus are reduced by continuously providing feedback to allow the component vibration component value to remain '0' or a numerical value close to '0', thereby providing an optimal driving environment to a driver.

Also, since the vibrations generated in real time are reduced in effective response thereto, a feeling of insecurity which occurs due to the vibrations of the steering apparatus can be quickly relieved.

The sensing of the steering vibration signal (S100) may include sensing a torque signal (S110) and extracting the steering vibration signal (S120).

In the sensing of the torque signal (S110), the torque signal is sensed by a torque sensor 10 sensing vibrations generated outside and inside the vehicle.

In the extracting the steering vibration signal (S120), the sensed torque signal is input to the vibration filter unit 20 and the steering vibration signal that is a radio frequency component which generates the vibrations of the steering apparatus is extracted.

The method of reducing the vibrations of the electronic steering apparatus according to another embodiment of the present invention may include the gain unit 70.

The gain unit 70 modifies at least one of a level and a phase of the current control signal to be appropriate for vehicular properties and applies the same to the motor 50.

Although the steering vibration component value may approach '0' to reduce vibrations without the gain unit 70, when the steering vibration component value starts with a too great value or an unexpected value, a large amount of time may be consumed for reducing the vibrations and greater vibrations may occur.

Due to this, values related to the vehicular properties are stored in the gain unit 70 and the current control signal is modified based on the stored values, thereby quickly reducing the vibrations.

Also, the values of the gain unit 70 may be modified according to vehicles.

The providing of feedback to the adaptive filter 40 (S500) may include storing in the error unit 60 (S510) and updating the adaptive filter 40 with a coefficient (S520).

In the storing in the error unit 60 (S510), the steering vibration component value is stored.

In the updating the adaptive filter 40 with the coefficient (S520), the steering vibration component value stored in the error unit 60 is provided as feedback to the adaptive filter 40 to update the adaptive filter 40 with the coefficient.

Here, when the steering vibration component value stored in the error unit 60 which is a value of '0' or a value close to '0' is provided as feedback to the adaptive filter 40, the coefficient of the adaptive filter 40 is updated while remaining as the same value as that of the coefficient previously provided with feedback.

Also, the adaptive filter 40 may be formed of an FIR filer. The FIR filter may be formed as an LMS filer, an RLS filter, etc.

In a typical case, a heterodyne algorithm is used. However, since complicated computations are used to extract a certain frequency component, an MCU has a great load and a low speed and needs a lot of modifications to output optimal performance due to complicated algorithms.

However, since using a method of changing a filter coefficient, the adaptive filter 40 has simpler computations and higher speed than the heterodyne algorithm, thereby efficiently reducing the vibrations.

According to the embodiments of the present invention, in an apparatus and a method for reducing vibrations in an electronic steering apparatus, a current control signal generated based on a reference signal is applied to a motor, thereby reducing vibrations of the steering apparatus.

Also, a gain unit is included to be applied to various vehicles to reduce vibrations of steering apparatuses therein.

Also, since an adaptive filter is included to more efficiently reduce vibrations of a steering wheel than typical methods.

The effects of the present invention are not limited to the above disclosure; other effects not mentioned above may become apparent to those of ordinary skill in the art based on the following disclosure.

The embodiments and the attached drawings are merely examples which exemplarily illustrate a part of the technical concept of the present invention. Accordingly, since the embodiments disclosed herein are not to limit the technical concept of the present invention but to describe the same, it is obvious that the scope of the technical concept of the present invention is not limited to the embodiments. It will be apparent to those skilled in the art that various modifications can be made to the above-described exemplary embodiments of the present invention without departing from the spirit or the scope of the invention. Thus, it is intended that the present invention covers all such modifications provided they come within the scope of the appended claims and their equivalents.

What is claimed is:

1. An apparatus for reducing vibrations of an electronic steering apparatus, comprising:

a vibration filter unit which extracts a steering vibration signal that is a radio frequency component of a torque signal transmitted from a torque sensor;
a signal generation unit which generates a reference signal based on one of a wheel speed and a wheel vibration number transmitted from a sensor mounted in a vehicle;
an adaptive filter which receives the reference signal generated by the signal generation unit and generates a current control signal;
a motor which receives the current control signal; and
an error unit which stores a steering vibration component value generated based on the steering vibration signal and the current control signal applied to the motor, wherein the steering vibration component value stored in the error unit is provided as feedback to the adaptive filter to update the adaptive filter with a coefficient,
wherein the error unit provides the steering vibration component value as feedback to the adaptive filter so that the steering vibration component value becomes '0' or approaches '0'.

2. The apparatus of claim 1, comprising a gain unit which receives the current control signal and modifies a level and a phase of the current control signal.

3. The apparatus of claim 2, wherein the gain unit stores values related to vehicular properties which affect the steering vibration component value and modifies the current control signal based on the stored values.

4. The apparatus of claim 1, wherein the adaptive filter is formed as a finite impulse response filter (FIR).

5. The apparatus of claim 1, wherein the steering vibration signal is configured to generate vibrations in the electronic steering apparatus.

6. The apparatus of claim 1, wherein a frequency of the reference signal is controlled to be identical to a rotational frequency of a vehicular wheel.

7. The apparatus of claim 1, wherein the motor rotates in a direction opposite to vibration generated by the steering vibration signal.

8. The apparatus of claim 1, wherein:
the vibration filter unit is connected between the torque sensor and the error unit, and
the adaptive filter is connected between the signal generation unit and the motor.

9. The apparatus of claim 1, wherein the adaptive filter is configured to:
update the coefficient of the adaptive filter in response to the steering vibration component value provided as feedback by the error unit, and
generate the current control signal based on the updated coefficient of the adaptive filter.

10. A method of reducing vibrations of an electronic steering apparatus, the method comprising:
sensing a steering vibration signal while a vehicle is driven;
generating a reference signal based on at least one of a wheel speed and a wheel vibration number transmitted from a sensor of the vehicle;
generating a current control signal by inputting the reference signal into an adaptive filter;
generating a steering vibration component value based on the steering vibration signal by applying the current control signal to a motor; and
providing the steering vibration component value as feedback to the adaptive filter,
wherein the steering vibration component value is provided as feedback to the adaptive filter so that the steering vibration component value becomes '0' or approaches '0'.

11. The method of claim 10, wherein the sensing of the steering vibration signal comprises:
sensing, by a torque sensor, a torque signal; and
extracting the steering vibration signal by inputting the torque signal into a vibration filter unit.

12. The method of claim 10, wherein at least one of a level and a phase of the current control signal is modified by a gain unit and is applied to the motor.

13. The method of claim 10, wherein the providing feedback to the adaptive filter comprises:
storing the steering vibration component value in an error unit; and
providing the steering vibration component value stored in the error unit as feedback to the adaptive filter to update the adaptive filter with a coefficient.

14. The method of claim 13, wherein the adaptive filter is formed as an FIR filter.

15. The method of claim 13, wherein the adaptive filter updates the coefficient of the adaptive filter in response to the steering vibration component value provided as feedback by the error unit, and generates the current control signal based on the updated coefficient of the adaptive filter.

16. The method of claim 10, wherein the steering vibration signal is a radio frequency component of a torque signal transmitted from a torque sensor.

17. The method of claim 10, wherein the steering vibration signal is configured to generate vibrations in the electronic steering apparatus.

18. The method of claim 10, wherein a frequency of the reference signal is controlled to be identical to a rotational frequency of a vehicular wheel.

19. The method of claim 10, wherein the motor rotates in a direction opposite to vibration generated by the steering vibration signal.

20. The method of claim 10, wherein the gain unit stores values related to vehicular properties which affect the steering vibration component value and modifies the current control signal based on the stored values.

* * * * *